(12) United States Patent
Casso

(10) Patent No.: US 6,249,948 B1
(45) Date of Patent: Jun. 26, 2001

(54) TRAILER CONSTRUCTION METHOD

(76) Inventor: Ronald P. Casso, 713 Colony Pl., Metairie, LA (US) 70003

( * ) Notice: Subject to any disclaimer, the term of this patent is extended or adjusted under 35 U.S.C. 154(b) by 0 days.

(21) Appl. No.: 09/467,277

(22) Filed: Dec. 20, 1999

(51) Int. Cl.$^7$ .................................................. B21K 21/16
(52) U.S. Cl. ........................ 29/401.1; 29/897.2; 296/181
(58) Field of Search .............................. 29/401.1, 897.2; 180/496, 501; 296/181

(56) References Cited

U.S. PATENT DOCUMENTS 1,279,070 * 9/1918 Zimmerman ...................... 29/401.1
6,017,083 * 1/2000 Edgeller .............................. 296/181

* cited by examiner

Primary Examiner—P. W. Echols
Assistant Examiner—Steven A Blount

(57) ABSTRACT

A trailer construction method that uses a factory constructed chassis from a front wheel drive, uni-body van in combination with a conversion kit to construct a closed trailer.

3 Claims, 7 Drawing Sheets

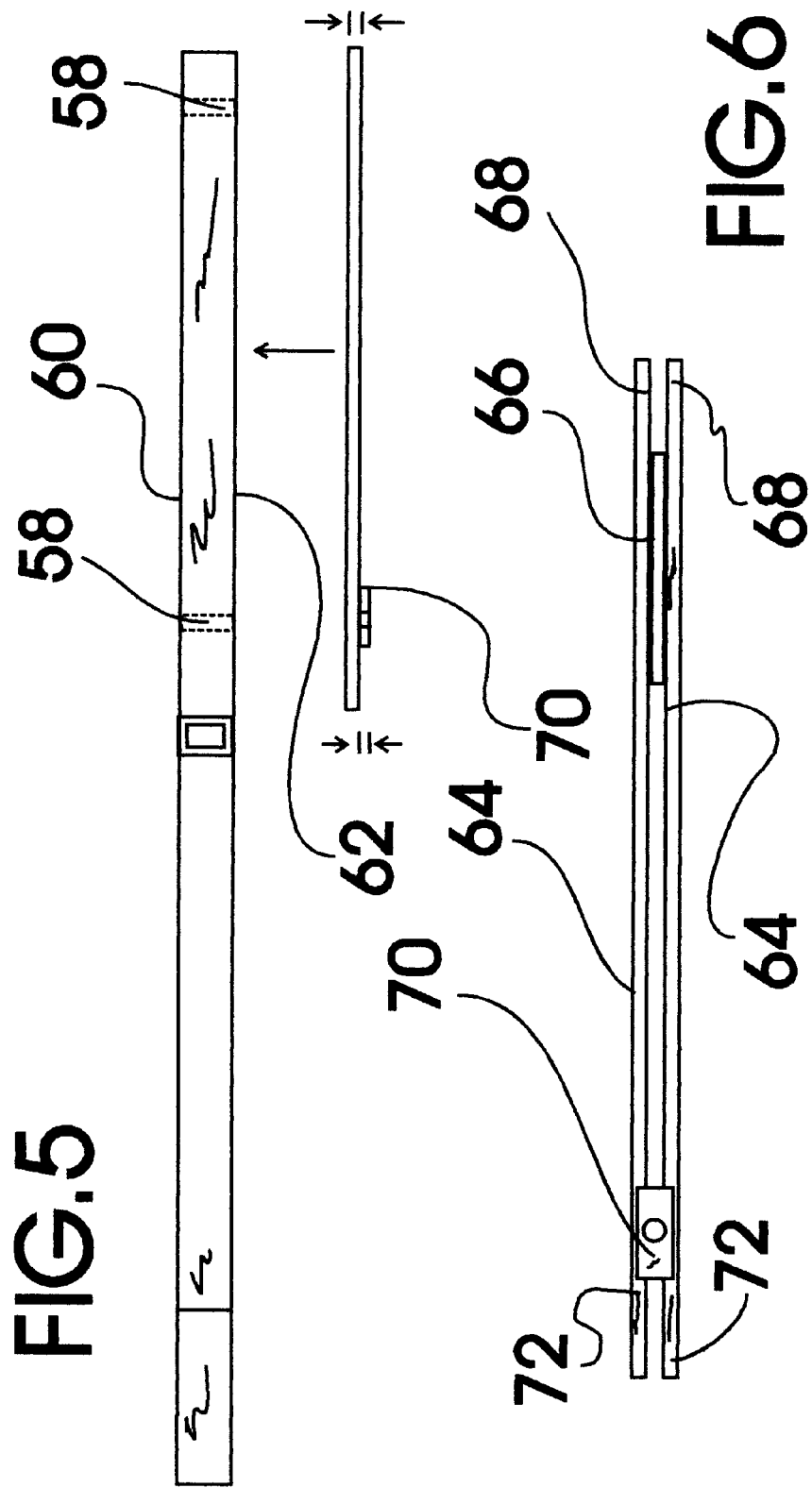

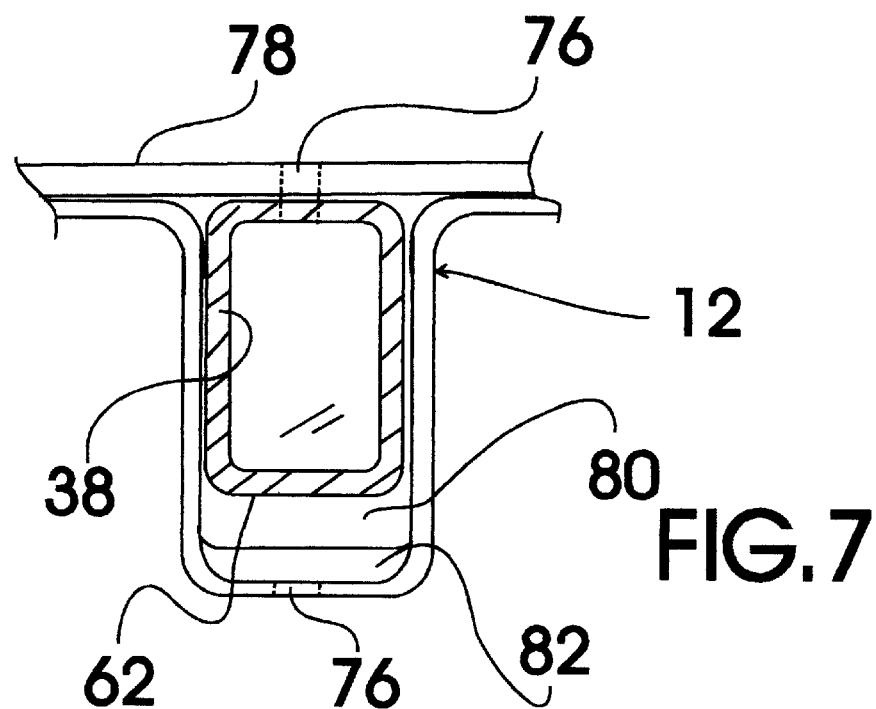
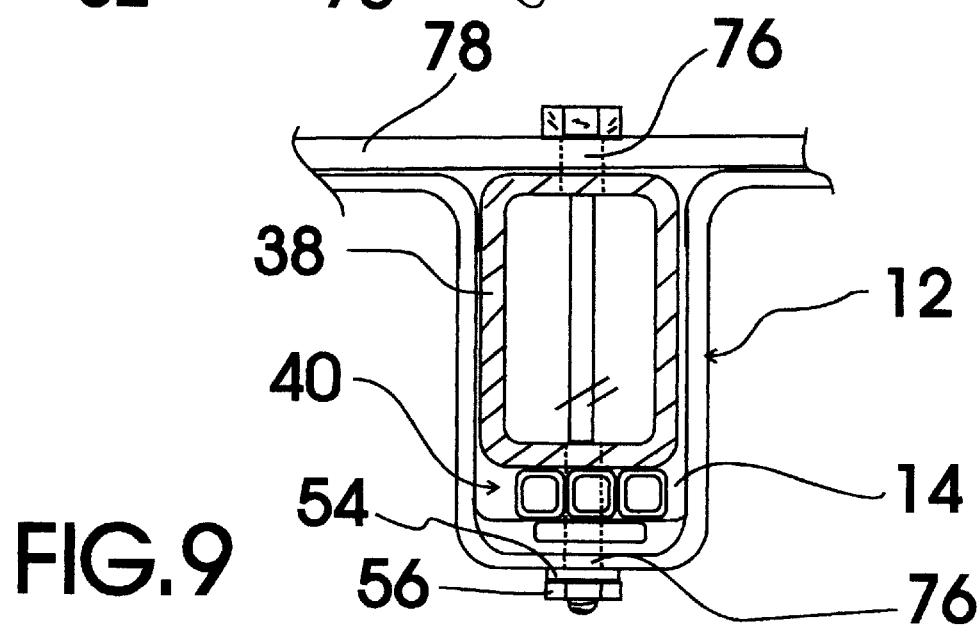

TRAILER CONSTRUCTION METHOD

TECHNICAL FIELD

The present invention relates to trailers for towing behind a motor vehicle and more particularly to a trailer construction method that includes the steps of a) providing a front wheel drive, uni-body van having two center chassis channel structures each having a tapered channel passageway formed therein; b) cutting the front wheel drive uni-body van just behind the front door frame to create a back trailer portion having a forward back trailer portion opening and two front channel openings into the two center chassis channel structures; c) providing a trailer conversion kit including a trailer frame member with a trailer ball receiving assembly attached to a forward frame member and two spaced parallel oriented channel insertion members oriented in parallel with the forward frame member, two channel insertion member shims, a trailer closure panel having a bottom center indentation for receiving therein the two spaced parallel oriented channel insertion members, and four securing bolt assembly each including a securing bolt, a lock washer and a lock nut; each of the two spaced parallel oriented channel insertion members having two pairs of insertion member securing apertures formed through opposed top and bottom insertion member surfaces; each channel insertion member shim including two elongated lengths of square steel tubing secured together and spaced in parallel orientation by a short length of identical square steel tubing secured therebetween toward the rear facing ends of the two elongated lengths of square steel tubing and a forward height adjustment plate secured between forward facing end of the two elongated lengths of square steel tubing; the forward height adjustment plate having a thickness selected to compensate for the tapering of the tapered channel passageway of the two center chassis channel structures within which it is to be inserted; d) providing four concentrically aligned pairs of trailer frame securing bolt apertures formed through a back trailer portion floor and the two center chassis channel structures; e) inserting the two spaced parallel oriented channel insertion members of the trailer frame member into the two tapered channel passageway of the two center chassis channel structures such that there is a gap between a bottom insertion member surface of each of the channel insertion members and a tapered interior bottom wall of the center chassis channel structure defining each of the tapered channel passageways; f) inserting one of the channel insertion member shims into each of the gaps between the bottom insertion member surface of one of the channel insertion members and the tapered interior bottom wall of one of the center chassis channel structure defining the tapered channel passageway; g) positioning a shaft end of each of the four securing bolts through one of the trailer frame securing bolt apertures drilled through the back trailer portion floor, one of the two pairs of insertion member securing apertures formed through opposed top and bottom insertion member surfaces, between the two elongated lengths of square steel tubing, and through one of the trailer frame securing bolt apertures drilled through the center chassis channel structure; h) positioning a lock washer over each shaft end and then threading a lock nut onto each shaft end to secure the back trailer portion and the trailer frame member together; and i) securing the trailer closure panel to the back trailer portion such that the forward back trailer portion opening is sealed and the two spaced parallel oriented channel insertion members of the trailer frame member positioned within the bottom center indentation of the trailer closure panel.

BACKGROUND ART

Many individuals participate in activities wherein they are required to transport large items or a large number of items to a different location. Because many of these individuals have vehicles with a small amount of cargo area, it would be a benefit to have a trailer attachable to a trailer hitch for transporting these items to the desired location. Because it may be necessary to transport these items in inclimate weather, it would be a further benefit to have an enclosed trailer. Although enclosed trailer's protect the items stored within, enclosed trailers can be flimsily built and often constructed using wood or the like riveted to a metal frame. It would be a benefit, therefore, to have a trailer construction method that allowed for the use of a factory constructed chassis having a metal housing and doors constructed of steel for a reasonable price. Because junk vans are often typically crushed and sold for scrap metal, it would be a further benefit to have a trailer construction method that utilized a back portion of a junk front wheel drive van including the hinged back and side doors, the existing brake light system, and the rear axle and shock assembly.

GENERAL SUMMARY DISCUSSION OF INVENTION

It is thus an object of the invention to provide a trailer construction method that includes the steps of a) providing a front wheel drive, uni-body van having two center chassis channel structures each having a tapered channel passageway formed therein; b) cutting the front wheel drive uni-body van just behind the front door frame to create a back trailer portion having a forward back trailer portion opening and two front channel openings into the two center chassis channel structures; c) providing a trailer conversion kit including a trailer frame member with a trailer ball receiving assembly attached to a forward frame member and two spaced parallel oriented channel insertion members oriented in parallel with the forward frame member, two channel insertion member shims, a trailer closure panel having a bottom center indentation for receiving therein the two spaced parallel oriented channel insertion members, and four securing bolt assembly each including a securing bolt, a lock washer and a lock nut; each of the two spaced parallel oriented channel insertion members having two pairs of insertion member securing apertures formed through opposed top and bottom insertion member surfaces; each channel insertion member shim including two elongated lengths of square steel tubing secured -together and spaced in parallel orientation by a short length of identical square steel tubing secured therebetween toward the rear facing ends of the two elongated lengths of square steel tubing and a forward height adjustment plate secured between forward facing end of the two elongated lengths of square steel tubing; the forward height adjustment plate having a thickness selected to compensate for the tapering of the tapered channel passageway of the two center chassis channel structures within which it is to be inserted; d) providing four concentrically aligned pairs of trailer frame securing bolt apertures formed through a back trailer portion floor and the two center chassis channel structures; e) inserting the two spaced parallel oriented channel insertion members of the trailer frame member into the two tapered channel passageway of the two center chassis channel structures such that there is a gap between a bottom insertion member surface of each of the channel insertion members and a tapered interior bottom wall of the center chassis channel structure defining each of the tapered channel passageways; f) inserting one of the channel insertion member shims into each of the gaps between the bottom insertion member surface of one of the channel insertion members and the tapered interior bottom wall of one of the center chassis channel structure defining the tapered channel passageway; g) positioning a shaft end of each of the four securing bolts through one of the trailer frame securing bolt apertures drilled through the back trailer portion floor, one of the two pairs of insertion member securing apertures formed through opposed top and bottom insertion member surfaces, between the two elongated lengths of square steel tubing, and through one of the trailer frame securing bolt apertures drilled through the center chassis channel structure; h) positioning a lock washer over each shaft end and then threading a lock nut onto each shaft end to secure the back trailer portion and the trailer frame member together; and i) securing the trailer closure panel -to the back trailer portion such that the forward back trailer portion opening is sealed and the two spaced parallel oriented channel insertion members of the trailer frame member positioned within the bottom center indentation of the trailer closure panel.

Accordingly, a trailer construction method is provided. The trailer construction method includes the steps of a) providing a front wheel drive, uni-body van having two center chassis channel structures each having a tapered channel passageway formed therein; b) cutting the front wheel drive uni-body van just behind the front door frame to create a back trailer portion having a forward back trailer portion opening and two front channel openings into the two center chassis channel structures; c) providing a trailer conversion kit including a trailer frame member with a trailer ball receiving assembly attached to a forward frame member and two spaced parallel oriented channel insertion members oriented in parallel with the forward frame member, two channel insertion member shims, a trailer closure panel having a bottom center indentation for receiving therein the two spaced parallel oriented channel insertion members, and four securing bolt assembly each including a securing bolt, a lock washer and a lock nut; each of the two spaced parallel oriented channel insertion members having two pairs of insertion member securing apertures formed through opposed top and bottom insertion member surfaces; each channel insertion member shim including two elongated lengths of square steel tubing secured together and spaced in parallel orientation by a short length of identical square steel tubing secured therebetween toward the rear facing ends of the two elongated lengths of square steel tubing and a forward height adjustment plate secured between forward facing end of the two elongated lengths of square steel tubing; the forward height adjustment plate having a thickness selected to compensate for the tapering of the tapered channel passageway of the two center chassis channel structures within which it is to be inserted; d) providing four concentrically aligned pairs of trailer frame securing bolt apertures formed through a back trailer portion floor and the two center chassis channel structures; e) inserting the two spaced parallel oriented channel insertion members of the trailer frame member into the two tapered channel passageway of the two center chassis channel structures such that there is a gap between a bottom insertion member surface of each of the channel insertion members and a tapered interior bottom wall of the center chassis channel structure defining each of the tapered channel passageways; f) inserting one of the channel insertion member shims into each of the gaps between the bottom insertion member surface of one of the channel insertion members and the tapered interior bottom wall of one of the center chassis channel structure defining the tapered channel passageway; g) positioning a shaft end of each of the four securing bolts through one of the trailer frame securing bolt apertures drilled through the back trailer portion floor, one of the two pairs of insertion member securing apertures formed through opposed top and bottom insertion member surfaces, between the two elongated lengths of square steel tubing, and through one of the trailer frame securing bolt apertures drilled through the center chassis channel structure; h) positioning a lock washer over each shaft end and then threading a lock nut onto each shaft end to secure the back trailer portion and the trailer frame member together; and i) securing the trailer closure panel to the back trailer portion such that the forward back trailer portion opening is sealed and the two spaced parallel oriented channel insertion members of the trailer frame member positioned within the bottom center indentation of the trailer closure panel.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 5 is a side plan view of the trailer frame member and one of the two identical channel insertion member shims; each channel insertion member shim including two elongated lengths of square steel tubing secured together and spaced in parallel orientation by a short length of identical square steel tubing secured therebetween toward the rear facing ends of the two elongated lengths of square steel tubing and a forward height adjustment plate secured between forward facing end of the two elongated lengths of square steel tubing; the forward height adjustment plate having a thickness selected to compensate for the tapering of the tapered channel passageway of the two center chassis channel structures within which it is to be inserted.

FIG. 6 is a top plan view of one of the two identical channel insertion member shims; each channel insertion member shim including two elongated lengths of square steel tubing secured together and spaced in parallel orientation by a short length of identical square steel tubing secured therebetween toward the rear facing ends of the two elongated lengths of square steel tubing and a forward height adjustment plate secured between forward facing end of the two elongated lengths of square steel tubing having a securing bolt aperture provided therethrough in alignment with a space between the two elongated lengths of square steel tubing.

FIG. 7 is a front plan view showing a section through one of the two spaced parallel oriented channel insertion members of the trailer frame member inserted into the tapered channel passageway of one of the two center chassis channel structures showing the gap between the bottom insertion member surface of the channel insertion member and the tapered interior bottom wall of the center chassis channel structure defining the tapered channel passageway.

FIG. 9 is a front plan view showing a section through one of the two spaced parallel oriented channel insertion members of the trailer frame member inserted into the tapered channel passageway of one of the two center chassis channel structures; one of the two the channel insertion member shims inserted into the gap between the bottom insertion member surface of the channel insertion member and the tapered interior bottom wall of the center chassis channel structure defining the tapered channel passageway; and the securing bolt positioned through one of the trailer frame securing bolt apertures drilled through the back trailer portion floor, one of the two pairs of insertion member securing apertures formed through opposed top and bottom insertion member surfaces, between the two elongated lengths of square steel tubing, through the securing bolt aperture provided through the forward height adjustment plate, and through one of the trailer frame securing bolt apertures drilled through the center chassis channel structure; and the lock washer and lock nut secured onto the threaded end of the securing bolt.

EXEMPLARY MODE FOR CARRYING OUT THE INVENTION

Figure 1:
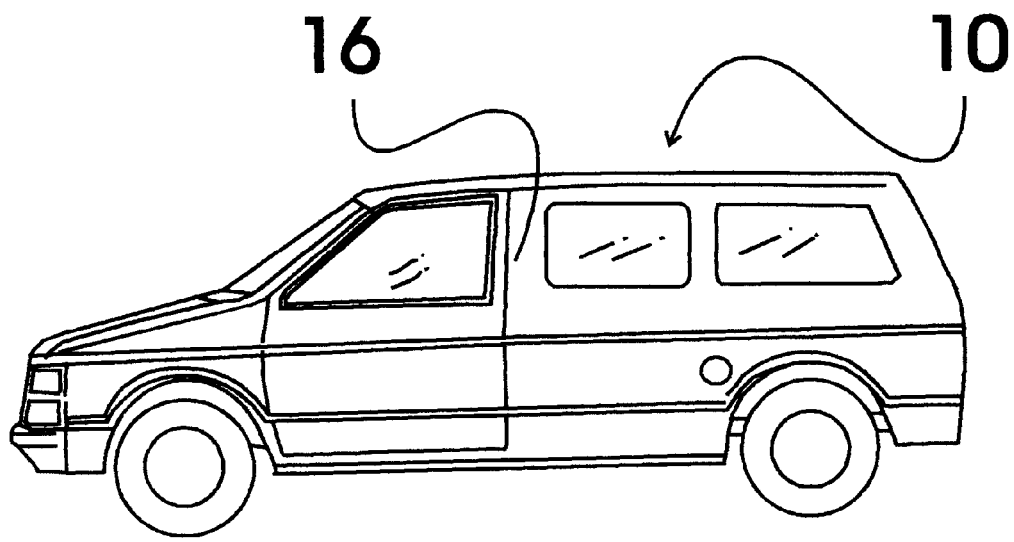
FIG. 1 is a side plan view of a representative front wheel drive, uni-body van.
Figure 2:
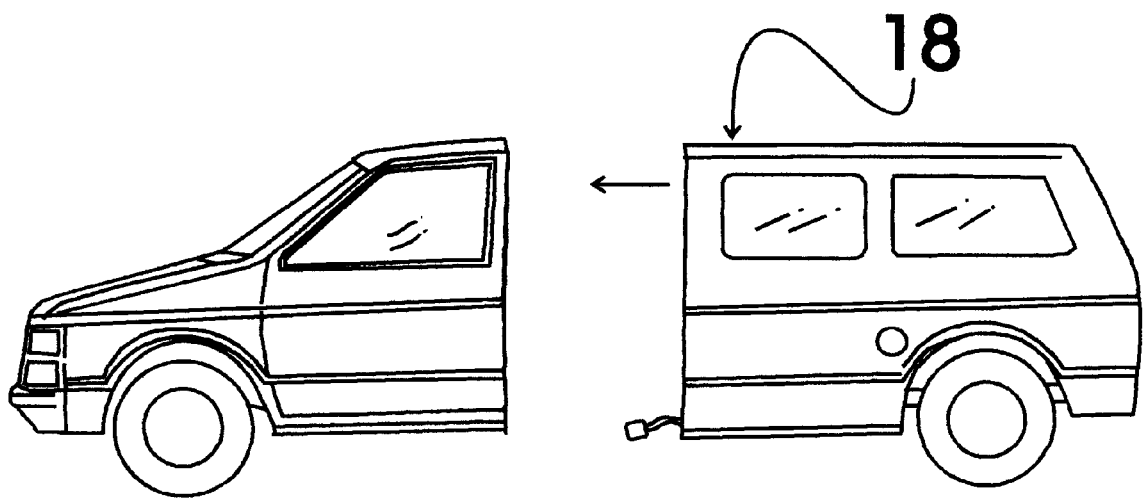
FIG. 2 is a side plan view of the representative front wheel drive, uni-body van of FIG. 1 cut into two parts just behind the front door frame to create a back trailer portion having a forward back trailer portion opening.
Figure 3:
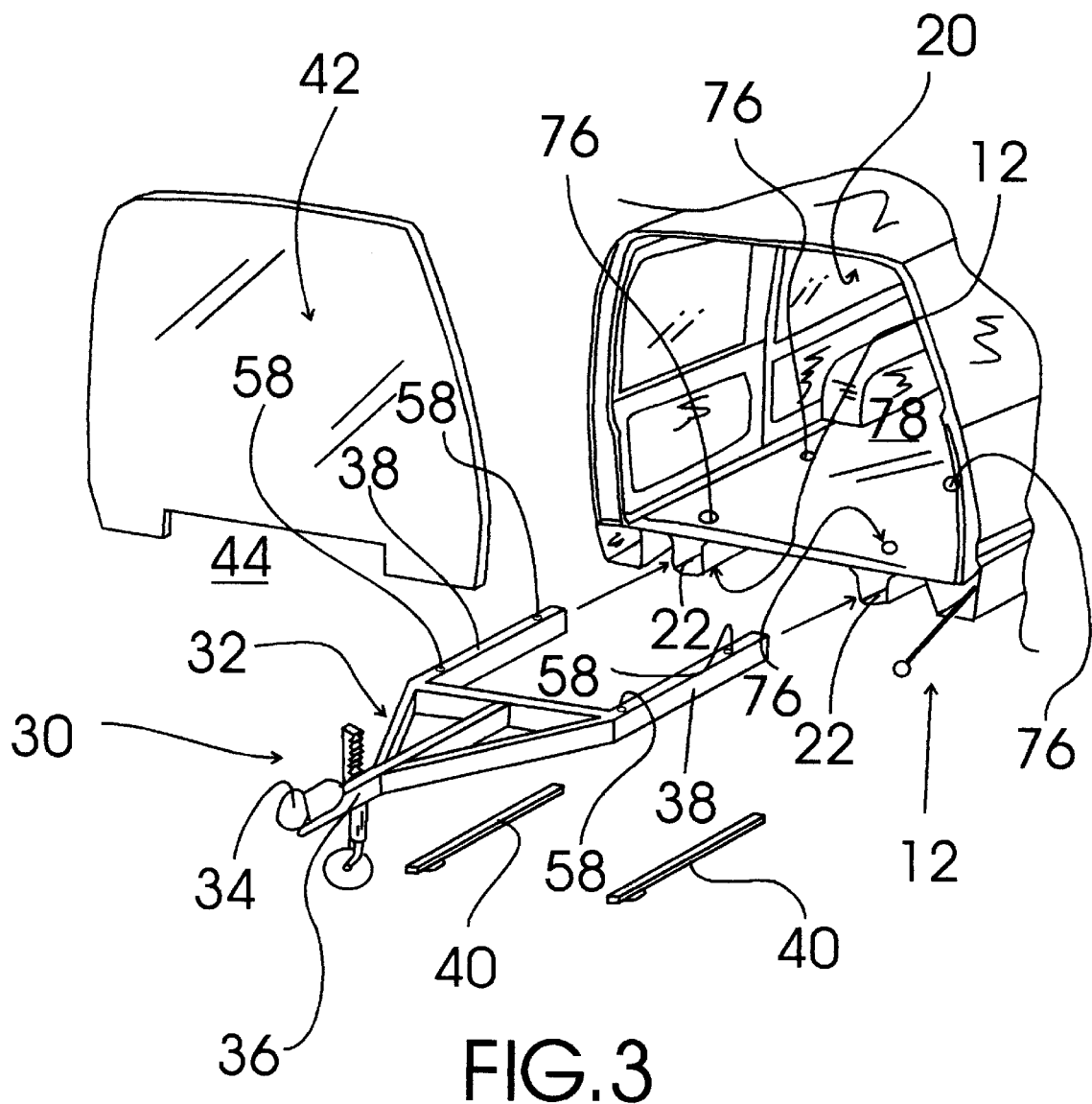
FIG. 3 is a partial perspective view of the back trailer portion showing the two center chassis channel structures each having a tapered channel passageway accessible through a front channel opening and an exemplary embodiment of the trailer conversion kit of the present invention showing the trailer frame member with a trailer ball receiving assembly attached to a forward frame member, a adjustable height support wheel, and two spaced parallel oriented channel insertion members oriented in parallel with the forward frame member; two channel insertion member shims; and a trailer closure panel having a bottom center indentation for receiving therein the two spaced parallel oriented channel insertion members; each of the two spaced parallel oriented channel insertion members having two pairs of insertion member securing apertures formed through opposed top and bottom insertion member surfaces.
Figure 4:
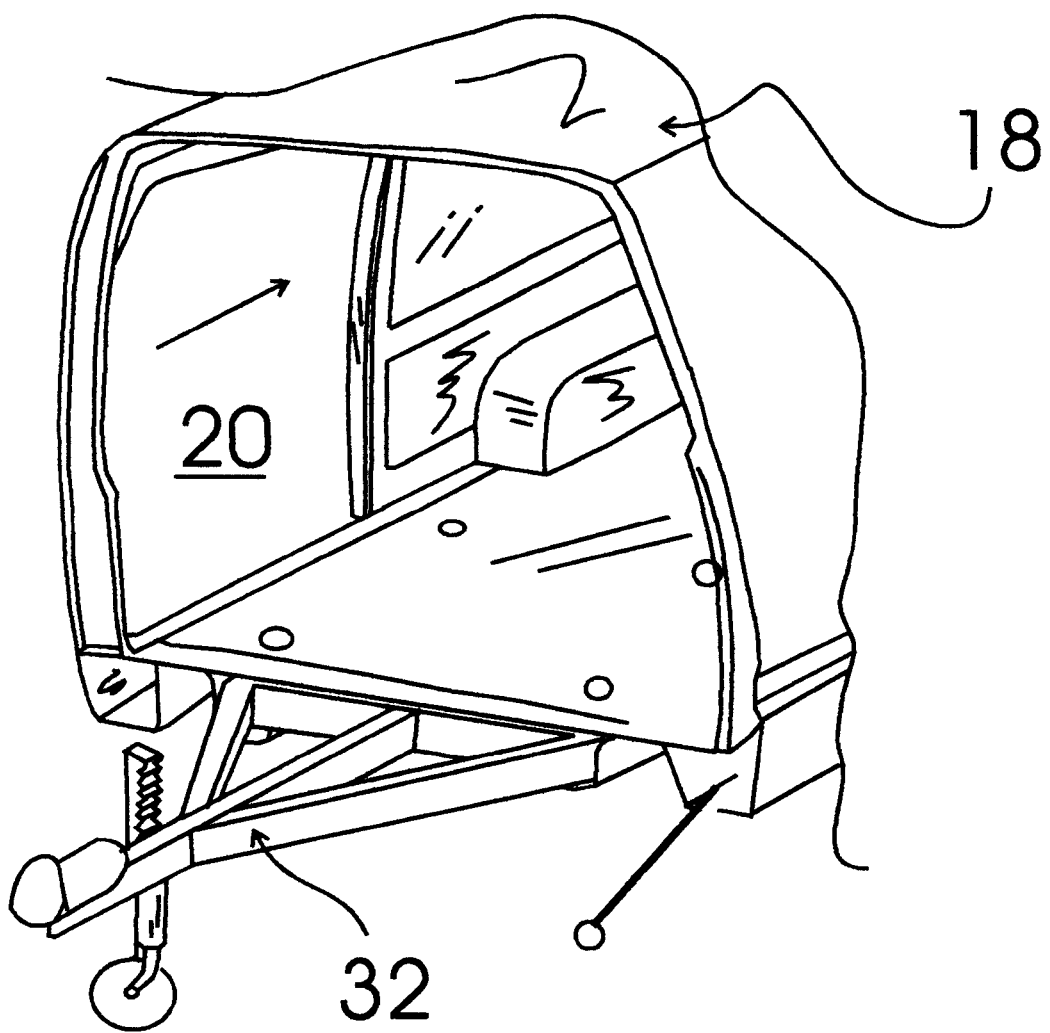
FIG. 4 is a partial perspective view of the back trailer portion showing for trailer frame securing bolt apertures drilled through the back trailer portion floor and the two center chassis channel structures; and the two spaced parallel oriented channel insertion members of the trailer frame member inserted into the tapered channel passageways of the two center chassis channel structures.
Figure 8:
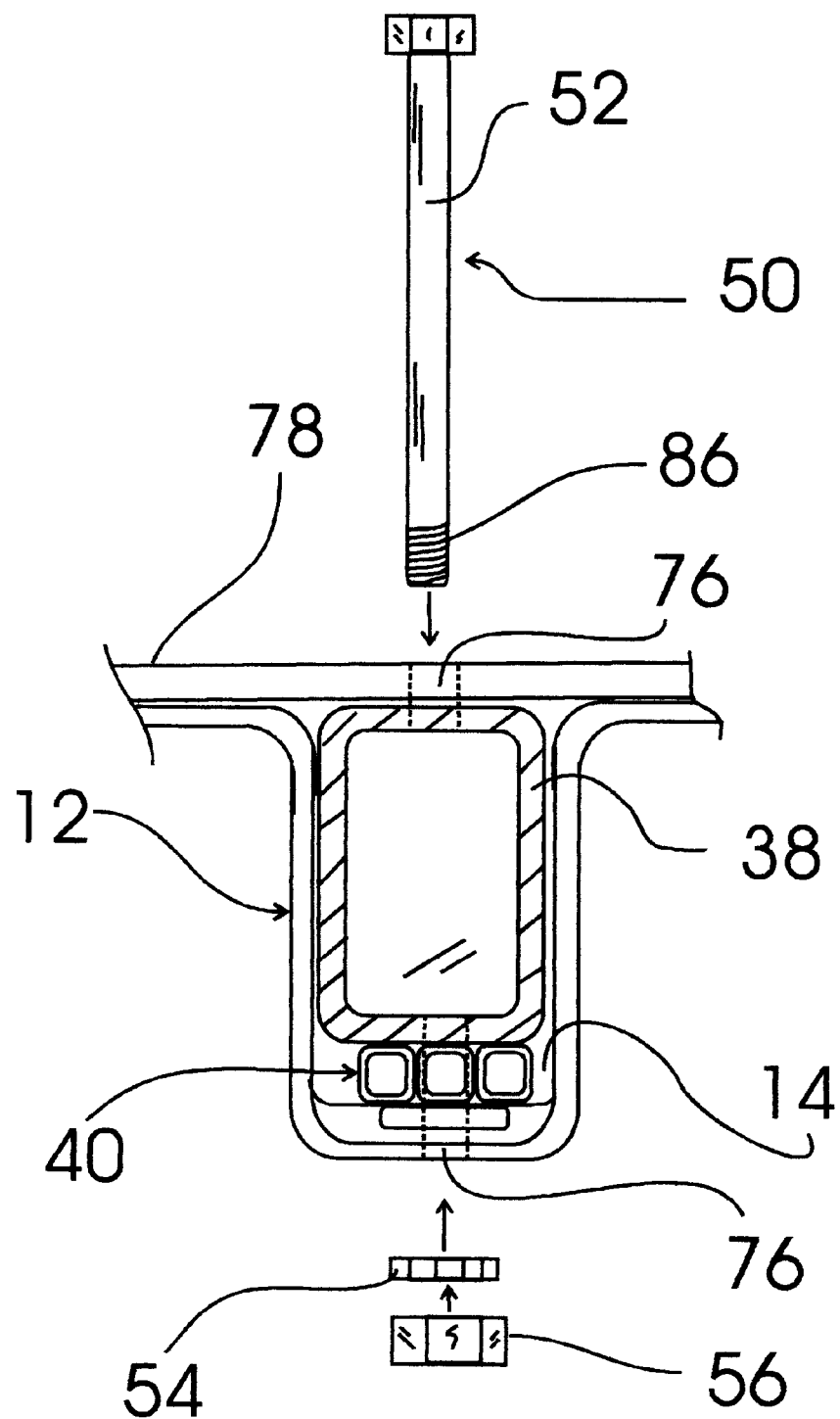
FIG. 8 is a front plan view showing a section through one of the two spaced parallel oriented channel insertion members of the trailer frame member inserted into the tapered channel passageway of one of the two center chassis channel structures and the channel insertion member shim inserted into the gap between the bottom insertion member surface of the channel insertion member and the tapered interior bottom wall of the center chassis channel structure defining the tapered channel passageway and a securing bolt assembly showing the securing bolt, the lock washer and the lock nut.
Figure 10:
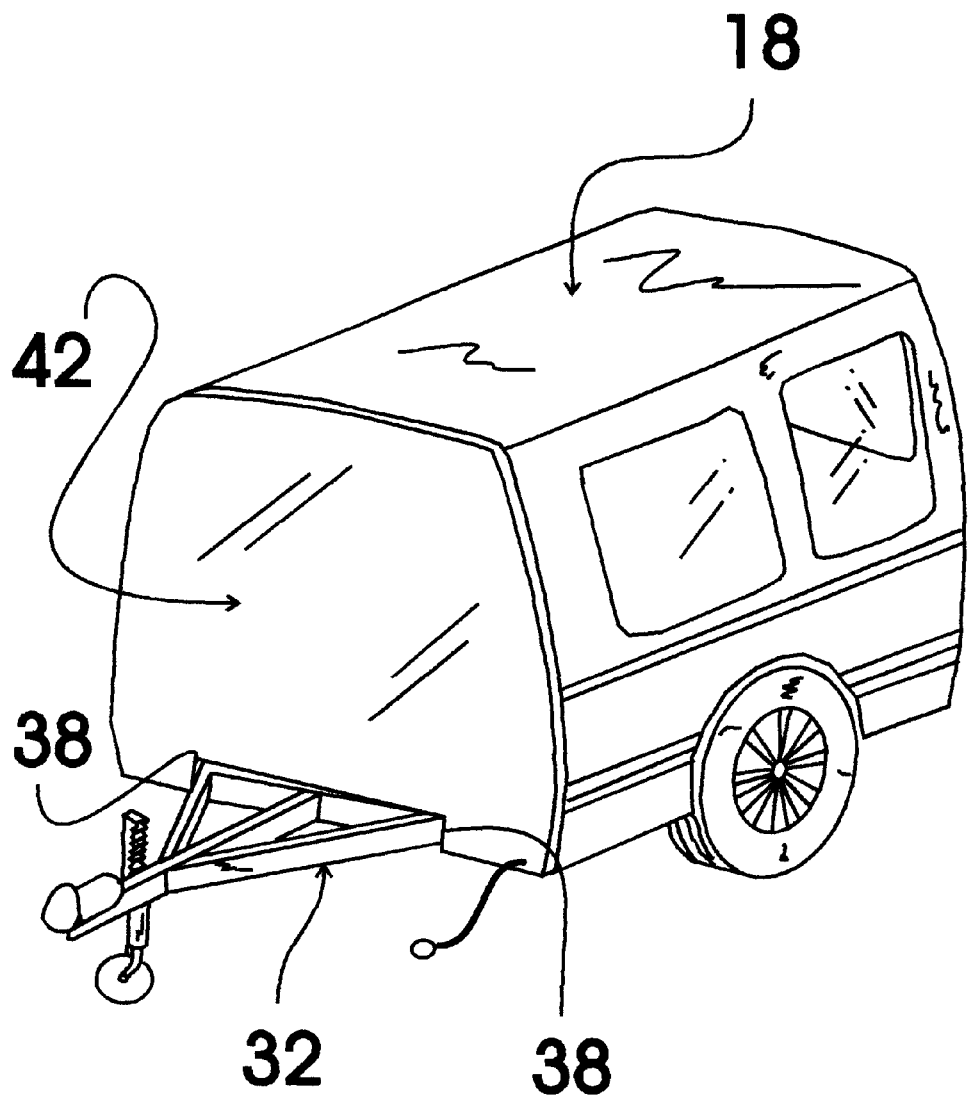
FIG. 10 is a perspective view of a trailer constructed according to the exemplary trailer construction method of the present invention with the trailer closure panel secured to the back trailer portion such that the forward back trailer portion opening is sealed and the two spaced parallel oriented channel insertion members of the trailer frame member positioned within the bottom center indentation of the trailer closure panel.

FIGS. 1–10 are generally referred to in the description of the exemplary embodiment of the trailer construction method of the present invention. The trailer construction method includes the steps of a) providing a front wheel drive, uni-body van, generally designated 10, having two center chassis channel structures, generally designated 12, each having a tapered channel passageway 14 formed therein and a front door frame 16; b) cutting the front wheel drive uni-body van 10 just behind the front door frame 16 to create a back trailer portion, generally designated 18, having a forward back trailer portion opening 20 and two front channel openings 22 into the two center chassis channel structures 12; c) providing a trailer conversion kit, generally designated 30, including a trailer frame member, generally designated 32, with a trailer ball receiving assembly 34 attached to a forward frame member 36 and two spaced parallel oriented channel insertion members 38 oriented in parallel with forward frame member 36, two channel insertion member shims, each generally designated 40, a trailer closure panel, generally designated 42, having a bottom center indentation 44 for receiving therein the two spaced parallel oriented channel insertion members 38, and four identical securing bolt assemblies, generally designated 50, each including a securing bolt 52, a lock washer 54 and a lock nut 56; each of the two spaced parallel oriented channel insertion members having two pairs of insertion member securing apertures 58 formed through opposed top and bottom insertion member surfaces 60,62; each channel insertion member shim 40 including two elongated lengths of square steel tubing 64 secured together and spaced in parallel orientation by a short length of identical square steel tubing 66 secured therebetween by welding toward the rear facing ends 68 of the two elongated lengths of square steel tubing 64 and a forward height adjustment plate 70 secured between forward facing ends 72 of the two elongated lengths of square steel tubing 64; the forward height adjustment plate 70 having a thickness selected to compensate for the tapering of the tapered channel passageways 14 of the two center chassis channel structures 12 within which it is to be inserted; d) providing four concentrically aligned pairs of trailer frame securing bolt apertures 76 formed through a back trailer portion floor 78 and the two center chassis channel structures 12; e) inserting the two spaced parallel oriented channel insertion members 38 of the trailer frame member 32 into the two tapered channel passageway 14 of the two center chassis channel structures 12 such that there is an angled gap 80 between a bottom insertion member surface 62 of each of the channel insertion members 38 and a tapered interior bottom wall 82 of the center chassis channel structure 12 defining each of the tapered channel passageways 14; f) inserting one of the channel insertion member shims 40 into each of the gaps 80 between the bottom insertion member surface 62 of one of the channel insertion members 38 and the tapered interior bottom wall 82 of one of the center chassis channel structure 12 defining the tapered channel passageway 14; g) positioning a threaded shaft end 86 of each of the four securing bolts 52 through one of the trailer frame securing bolt apertures 76 drilled through the back trailer portion floor 78, one of the two pairs of insertion member securing apertures 58 formed through opposed top and bottom insertion member surfaces 60,62, between the two elongated lengths of square steel tubing 64 of one of the channel insertion member shims 40, and through one of the trailer frame securing bolt apertures 76 drilled through the center chassis channel structure 12; h) positioning a lock washer 54 over each threaded shaft end 86 and then threading the lock nut 56 onto each threaded shaft end to secure the back trailer portion 18 and trailer frame member 32 together; and i) securing the trailer closure panel 42 to the back trailer portion 18 using auto body repair fiberglass such that the forward back trailer portion opening 20 is sealed and the two spaced parallel oriented channel insertion members of trailer frame member 32 are positioned within the bottom center indentation 44 of the trailer closure panel 42.

It can be seen from the preceding description that a trailer construction method has been provided.

It is noted that the embodiment of the trailer construction method described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A trailer construction method comprising the steps of:
   a) providing a front wheel drive, uni-body van having two center chassis channel structures each having a channel passageway formed therein and a front door frame;
   b) cutting said front wheel drive uni-body van just behind said front door frame to create a back trailer portion having a forward back trailer portion opening and two front channel openings into said two center chassis channel structures;
   c) providing a trailer conversion kit including a trailer frame member with a trailer ball receiving assembly attached to a forward frame member and two spaced parallel oriented channel insertion members oriented in parallel with said forward frame member and a trailer closure panel having a bottom center indentation for receiving therein said two spaced parallel oriented channel insertion members,
   d) providing securing means for securing said trailer frame member to said back trailer portion;
   e) inserting said two spaced parallel oriented channel insertion members of said trailer frame member into said two channel passageways of said two center chassis channel structures;
   f) securing each of said two spaced parallel oriented channel insertion members of said trailer frame member to a respective one of said two center chassis channel structures using said securing means; and
   g) securing said trailer closure panel to said back trailer portion such that said forward back trailer portion opening is sealed and said two spaced parallel oriented channel insertion members of said trailer frame member positioned within said bottom center indentation of said trailer closure panel.

2. A trailer construction method comprising the steps of:
   a) providing a front wheel drive, uni-body van having two center chassis channel structures each having a tapered channel passageway formed therein and a front door frame;
   b) cutting said front wheel drive uni-body van just behind said front door frame to create a back trailer portion having a forward back trailer portion opening and two front channel openings into said two center chassis channel structures;
   c) providing a trailer conversion kit including a trailer frame member with a trailer ball receiving assembly attached to a forward frame member and two spaced parallel oriented channel insertion members oriented in parallel with said forward frame member, two channel insertion member shims, a trailer closure panel having a bottom center indentation for receiving therein said two spaced parallel oriented channel insertion members, and securing means for securing said trailer frame member to said back trailer portion; said two channel insertion member shims having a varying thickness selected to compensate for said tapering of said tapered channel passageway of one of said two center chassis channel structures within which it is to be inserted;
   d) inserting said two spaced parallel oriented channel insertion members of said trailer frame member into said two tapered channel passageways of said two center chassis channel structures such that there is a gap between a bottom insertion member surface of each of said channel insertion members and a tapered interior bottom wall of said center chassis channel structure defining each of said tapered channel passageways;
   e) inserting one of said channel insertion member shims into each of said gaps between said bottom insertion member surface of one of said channel insertion members and said tapered interior bottom wall of one of said center chassis channel structure defining said tapered channel passageway;
   f) securing each of said two spaced parallel oriented channel insertion members of said trailer frame member to a respective one of said two center chassis channel structures using said securing means; and
   g) securing said trailer closure panel to said back trailer portion such that said forward back trailer portion opening is sealed and said two spaced parallel oriented channel insertion members of said trailer frame member positioned within said bottom center indentation of said trailer closure panel.

3. A trailer construction method comprising the steps of:
   a) providing a front wheel drive, uni-body van having two center chassis channel structures each having a tapered channel passageway formed therein and a front door frame;
   b) cutting said front wheel drive uni-body van just behind said front door frame to create a back trailer portion having a forward back trailer portion opening and two front channel openings into said two center chassis channel structures;
   c) providing a trailer conversion kit including a trailer frame member with a trailer ball receiving assembly attached to a forward frame member and two spaced parallel oriented channel insertion members oriented in parallel with said forward frame member, two channel insertion member shims, a trailer closure panel having a bottom center indentation for receiving therein said two spaced parallel oriented channel insertion members, and four securing bolt assembly each including a securing bolt, a lock washer and a lock nut; each of said two spaced parallel oriented channel insertion members having two pairs of insertion member securing apertures formed through opposed top and bottom insertion member surfaces; each channel insertion member shim including two elongated lengths of square steel tubing secured together and spaced in parallel orientation by a short length of identical square steel tubing secured therebetween toward said rear facing ends of said two elongated lengths of square steel tubing and a forward height adjustment plate secured between forward facing end of said two elongated lengths of square steel tubing; said forward height adjustment plate having a thickness selected to compensate for said tapering of said tapered channel passageway of said two center chassis channel structures within which it is to be inserted;
   d) providing four concentrically aligned pairs of trailer frame securing bolt apertures formed through a back trailer portion floor and said two center chassis channel structures;

e) inserting said two spaced parallel oriented channel insertion members of said trailer frame member into said two tapered channel passageways of said two center chassis channel structures such that there is a gap between a bottom insertion member surface of each of said channel insertion members and a tapered interior bottom wall of said center chassis channel structure defining each of said tapered channel passageways;

f) inserting one of said channel insertion member shims into each of said gaps between said bottom insertion member surface of one of said channel insertion members and said tapered interior bottom wall of one of said center chassis channel structure defining said tapered channel passageway;

g) positioning a shaft end of each of said four securing bolts through one of said trailer frame securing bolt apertures drilled through said back trailer portion floor, one of said two pairs of insertion member securing apertures formed through opposed top and bottom insertion member surfaces, between said two elongated lengths of square steel tubing, and through one of said trailer frame securing bolt apertures drilled through said center chassis channel structure;

h) positioning a lock washer over each shaft end and then threading a lock nut onto each shaft end to secure said back trailer portion and said trailer frame member together; and i) securing said trailer closure panel to said back trailer portion such that said forward back trailer portion opening is sealed and said two spaced parallel oriented channel insertion members of said trailer frame member positioned within said bottom center indentation of said trailer closure panel.

* * * * *